(No Model.) 2 Sheets—Sheet 1.

G. A. SCHUBERT.
DRIVING MECHANISM FOR VELOCIPEDES.

No. 398,455. Patented Feb. 26, 1889.

Witnesses:
E. R. Brown
E. L. Richards

Inventor:
Gustav Adolf Schubert
By Richards &
Attorneys.

(No Model.) 2 Sheets—Sheet 2.
G. A. SCHUBERT.
DRIVING MECHANISM FOR VELOCIPEDES.
No. 398,455. Patented Feb. 26, 1889.
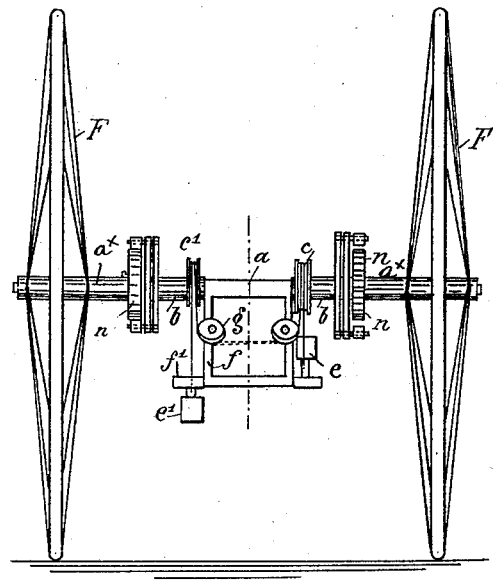
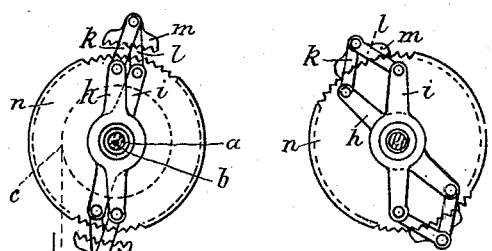
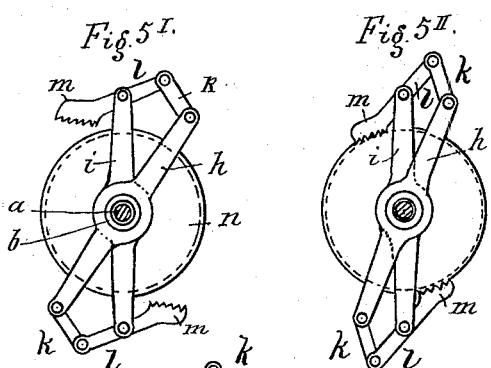
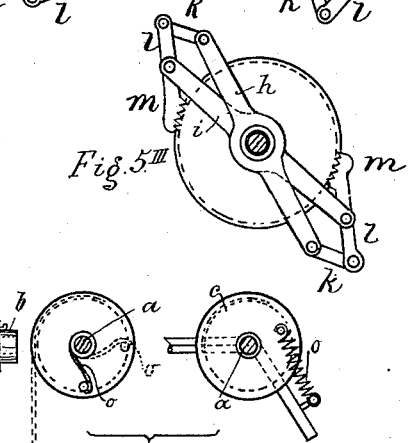
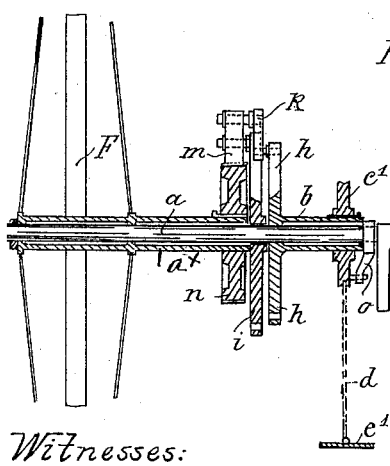
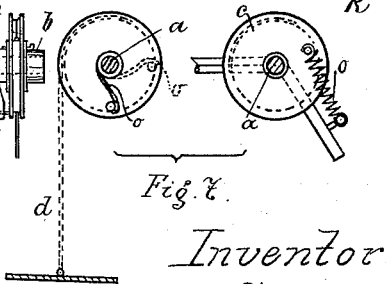
Witnesses:
E. R. Brown
E. L. Richards
Inventor:
Gustav Adolf Schubert
By Richards
Attorneys.

UNITED STATES PATENT OFFICE.

GUSTAV ADOLF SCHUBERT, OF BERLIN, GERMANY.

DRIVING MECHANISM FOR VELOCIPEDES.

SPECIFICATION forming part of Letters Patent No. 398,455, dated February 26, 1889.

Application filed November 26, 1888. Serial No. 291,838. (No model.)

*To all whom it may concern:*

Be it known that I, GUSTAV ADOLF SCHUBERT, a subject of the King of Prussia and Emperor of Germany, and a resident of Berlin, in the Kingdom of Prussia, German Empire, have invented certain new and useful Improvements in Driving Mechanism for Velocipedes; and I do hereby declare that the following is a full, clear, and exact description of the same.

My invention relates to a driving mechanism in which the motion is imparted by adjustable oscillating levers and an intermittently-operating pawl-and-ratchet movement, as hereinafter more particularly described.

The invention will be understood on reference to the accompanying drawings, in which—

Figure 1:
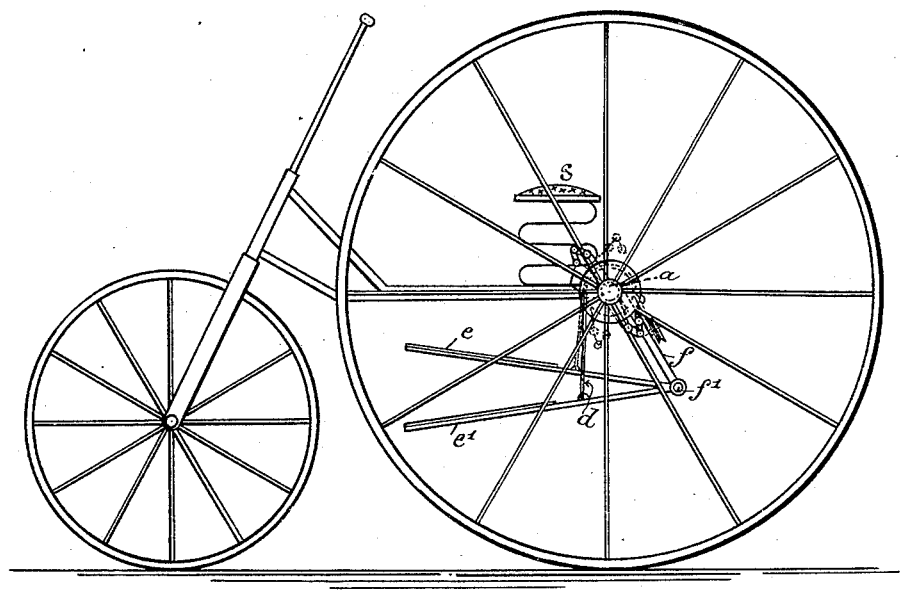
Figure 2:
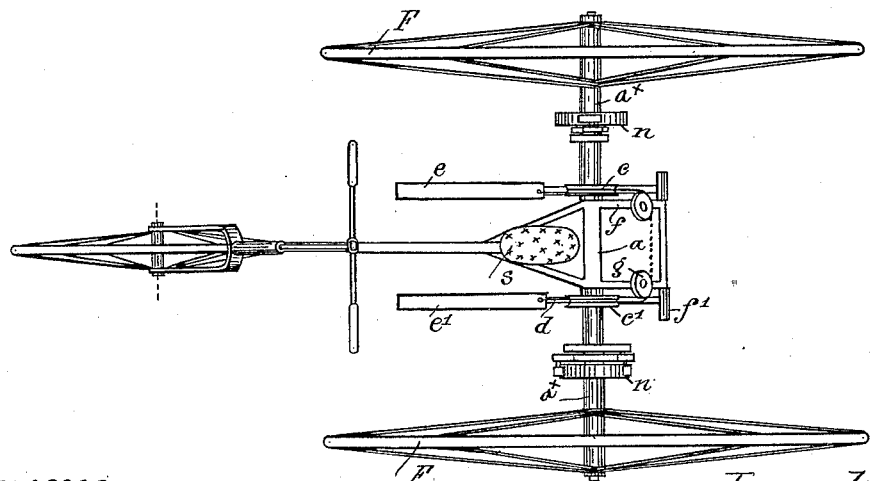

Figure 1 is a side view of a tricycle provided with my improved driving mechanism. Fig. 2 is a top view, and Fig. 3 a rear view of the same. Figs. 4, $4^a$, $5^I$, $5^{II}$, $5^{III}$, 6, and 7 are detail views on an enlarged scale.

Near the ends of the main axle $a$, and surrounding the same, are loose boxes or sleeves $b$, which carry disks or drums $c$ $c'$. These drums are connected by a cord or chain, $d$, with the treadles $e$ $e'$, which consist of oscillating levers of the second kind, having their fulcra on the ends of a shaft, $f'$, carried by a fork, $f$, extending downward and rearward from the main axle $a$. The ends of the cord or chain are attached to its lever between its fulcrum and the point of application of the power. The cord or chain $d$ has one end attached to the treadle $e$ and is passed upward and over the disk or drum $c$, thence rearward and around two pulleys, $g$ $g$, thence forward and over the disk or drum $c'$, and thence downward, and has its other end attached to the other treadle, $e'$. The length of the cord or chain $d$ is such that when one treadle is at the highest position the other treadle is at its lowest position. The guiding-pulleys $g$ $g$ have their bearings or studs or pins carried by the fork $f$.

The seat $s$ is arranged above the main axle, being attached in the usual or any suitable manner. As the rider presses with his feet on the two treadles alternately, a reciprocating rotary motion is imparted to the disks or drums $c$ $c'$ and the devices connected therewith, as hereinafter described.

Attached to each box or sleeve $b$, at the end opposite the disk or drum $c$ or $c'$, is a two-armed lever, $h$, the sleeve $b$ forming the fulcrum of the lever. Immediately adjoining this lever $h$ is another two-armed lever, $i$, working loosely on the main axle $a$, which forms the fulcrum of said lever. The ends of the levers $h$ $i$ are connected with each other by links or short bars $k$ $l$, the inner ends of the links being pivoted to the ends of the levers, and the outer ends of the links being pivoted to each other, as shown in Figs. 4 and $4^a$. At the point where the outer ends of the links $k$ $l$ are pivoted to each other there is pivoted a pawl $m$, consisting of a block provided on its lower edge with teeth for engagement with ratchet-teeth on the periphery of a wheel or disk, $n$, carried by the hub of one of the main or rear wheels. This hub consists of a sleeve, $a^x$, turning loosely on the axle $a$ and having the wheel F rigidly attached to its outer end. The levers $h$ $i$ and the links $k$ $l$, pivoted to each other, as above described, are capable of a motion similar to that of the combination of levers familiarly known as the "lazy-tongs."

The operation of the above-described devices is as follows: When one of the treadles is pressed down by the foot of the rider, the cord or chain $d$ gives the disk or drum $c$ or $c'$ a partial rotary motion. Before the pressure is applied to the treadle the parts are in the position shown in Fig. 4—that is to say, the levers $h$ $i$ and links $k$ $l$ are close together, and the toothed pawl $m$ is not engaged with the ratchet-toothed wheel $n$. As soon as the forward rotary motion of the disk or drum begins the levers and links begin to separate, and so continue until the toothed pawl $m$ engages with the ratchet-toothed wheel $n$, as shown in Fig. $4^a$. As the wheel $n$ is rigidly secured to the sleeve or hub $a^x$, a rotary motion is imparted to the wheel F and the vehicle is put in motion. When one treadle has completed its stroke and the forward oscillating motion of the levers connected therewith has reached its limit, the other treadle is put in motion by the pressure of the foot of the rider and the other disk or drum is rotated, carrying forward the other series of levers and links and causing the other pawl, $m$, to engage with the other ratchet-toothed wheel, and thus continue the rotary motion originally imparted. In the meantime the first treadle rises and the levers and links resume their former closed position, so as to place the pawl $m$ in position for engagement with the wheel, as before described.

If desired, the pawl $m$ may be in one piece with the link $l$ and at the end thereof, as shown in Figs. $5^\mathrm{I}$, $5^\mathrm{II}$, $5^\mathrm{III}$, in which case the operation of the pawl on the ratchet-wheel will be the same as above described.

Instead of having a single cord or chain, $d$, passing from one treadle over the disks or drums and around the pulleys to the other treadle, as above described, each treadle may be connected with its corresponding disk or drum by a single cord or chain having one end attached to the treadle and the other attached to the periphery of the wheel or disk. When the downward motion of the treadle is completed, the upward motion thereof and backward motion of the disk or drum and the lever mechanism are effected by means of a spring, $o$, having one end attached to the drum and the other end attached to the fork $f$, as shown in Fig. 7. When the parts are arranged in this manner, the rider is enabled to use both treadles at the same time, and thus acquire double propulsive force, which will prove advantageous when ascending grades or overcoming obstructions in the road. This arrangement also enables the rider to employ either one of the treadles independently of the other when desired.

What I claim as new, and desire to secure by Letters Patent, is—

1. A driving mechanism for velocipedes, consisting of treadle-levers $e$ $e'$, disks or drums $c$ $c'$, cord or chain $d$, pulleys $g$, levers $h$ $i$, links $k$ $l$, pawls $m$, and ratchet-toothed wheels $n$, combined, arranged, and operating substantially as herein described.

2. In a driving mechanism for velocipedes, the combination, with the sleeve or hub $a^\times$, carrying the riding-wheel F and the ratchet-toothed wheel $n$, of the toothed pawl $m$, links $k$ $l$, levers $h$ $i$, disk or drum $c$ or $c'$, cord or chain $d$, and treadle-levers $e$ or $e'$, arranged and operating substantially as herein described.

3. In a driving mechanism for velocipedes, the combination, with the riding-wheel and its sleeve or hub, the pawl-and-ratchet mechanism, and the lever-and-link mechanism, of a treadle-lever, a cord or chain, a disk or drum, and a spring, arranged and operating substantially as herein described.

4. In a driving mechanism for velocipedes, the combination, with the lever $h$, carried by the box or sleeve $b$, the lever $i$, working loosely on the axle $a$, and the ratchet-toothed wheel $n$, carried by the sleeve or hub $a^\times$, of the links $k$ $l$, and the pawl $m$, carried by the link $l$, substantially as herein described.

In witness whereof I have hereunto set my hand in presence of two witnesses.

GUSTAV ADOLF SCHUBERT.

Witnesses:
ALEX SCHOLZE,
B. ROI.